US010142137B2

United States Patent
Luo et al.

(10) Patent No.: US 10,142,137 B2
(45) Date of Patent: Nov. 27, 2018

(54) WIRELESS DEVICES AND SYSTEMS INCLUDING EXAMPLES OF FULL DUPLEX TRANSMISSION

(71) Applicant: MICRON TECHNOLOGY, INC., Boise, ID (US)

(72) Inventors: Fa-Long Luo, San Jose, CA (US); Jeremy Chritz, Seattle, WA (US); Jaime Cummins, Bainbridge Island, WA (US); Tamara Schmitz, Scotts Valley, CA (US)

(73) Assignee: Micron Technology, Inc., Boise, ID (US)

( * ) Notice: Subject to any disclaimer, the term of this patent is extended or adjusted under 35 U.S.C. 154(b) by 1 day.

(21) Appl. No.: 15/447,731

(22) Filed: Mar. 2, 2017

(65) Prior Publication Data
US 2018/0254930 A1  Sep. 6, 2018

(51) Int. Cl.
*H04L 25/08* (2006.01)
*H04L 5/14* (2006.01)
(Continued)

(52) U.S. Cl.
CPC ........... *H04L 25/08* (2013.01); *H04B 17/345* (2015.01); *H04L 5/14* (2013.01); *H04B 7/04* (2013.01)

(58) Field of Classification Search
CPC ......... H04L 25/08; H04L 5/14; H04B 17/345; H04B 7/04
See application file for complete search history.

(56) References Cited

U.S. PATENT DOCUMENTS

| 9,391,680 B2 * | 7/2016 | Le-Ngoc | H04B 7/0456 |
| 2015/0055568 A1 | 2/2015 | Jindal et al. | |
| 2018/0006690 A1 * | 1/2018 | Shepard | H04B 7/0456 |

FOREIGN PATENT DOCUMENTS

| CN | 104539341 A | 4/2015 |
| EP | 1164758 A2 * | 6/2001 |

(Continued)

OTHER PUBLICATIONS

U.S. Appl. No. 15/693,142, entitled "Cooperative Learning Neural Networks and Systems", filed Aug. 31, 2017, pp. all.

(Continued)

*Primary Examiner* — Nay A Maung
*Assistant Examiner* — Angelica M Perez
(74) *Attorney, Agent, or Firm* — Dorsey & Whitney LLP

(57) ABSTRACT

Examples described herein include systems and methods which include wireless devices and systems with examples of full duplex compensation with a self-interference noise calculator. The self-interference noise calculator may be coupled to antennas of a wireless device and configured to generate adjusted signals that compensate self-interference. The self-interference noise calculator may include a network of processing elements configured to combine transmission signals into sets of intermediate results. Each set of intermediate results may be summed in the self-interference noise calculator to generate a corresponding adjusted signal. The adjusted signal is received by a corresponding wireless receiver to compensate for the self-interference noise generated by a wireless transmitter transmitting on the same frequency band as the wireless receiver is receiving.

15 Claims, 7 Drawing Sheets

(51) Int. Cl.
   *H04B 17/345*   (2015.01)
   *H04B 7/04*   (2017.01)

(56) References Cited

FOREIGN PATENT DOCUMENTS

| | | |
|---|---|---|
| EP | 1164758 A2 | 12/2001 |
| KR | 20160090372 A | 7/2016 |

OTHER PUBLICATIONS

International Search Report and Written Opinion received for PCT Application No. PCT/US2018/020177, dated Jun. 4, 2018, pp. all.
U.S. Appl. No. 15/890,275 entitled "Self Interference Noise Cancellation to Support Multiple Frequency Bands" filed Feb. 6, 2018.
U.S. Appl. No. 15/701,007 entitled "Full Duplex Device-To-Device Cooperative Communication" filed Sep. 11, 2017.
U.S. Appl. No. 16/114,923 titled "Cooperative Learning Neural Networks and Systems" filed Aug. 28, 2018. pp. all.
U.S. Appl. No. 16/116,365 titled "Full Duplex Device-To-Device Cooperative Communication" filed Aug. 29, 2018, pp. all.
U.S. Appl. No. 16/105,915 titled "Wireless Devices and Systems Including Examples of Full Duplex Transmission", filed Aug. 20, 2018, pp. all.
U.S. Appl. No. 16/113,995 titled "Self Interference Noise Cancellation to Support Multiple Frequency Bands"; filed Aug. 27, 2018, pp. all.

\* cited by examiner

WIRELESS DEVICES AND SYSTEMS INCLUDING EXAMPLES OF FULL DUPLEX TRANSMISSION

BACKGROUND

There is interest in moving wireless communications to "fifth generation" (5G) systems. 5G promises increased speed and ubiquity, but methodologies for processing 5G wireless communications have not yet been set. Example 5G systems may be implemented using multiple-input multiple-output (MIMO) techniques, including "massive MIMO" techniques, in which multiple antennas (more than a certain number, such as 8 in the case of example MIMO systems) are utilized for transmission and/or receipt of wireless communication signals.

DETAILED DESCRIPTION

Figure 1:
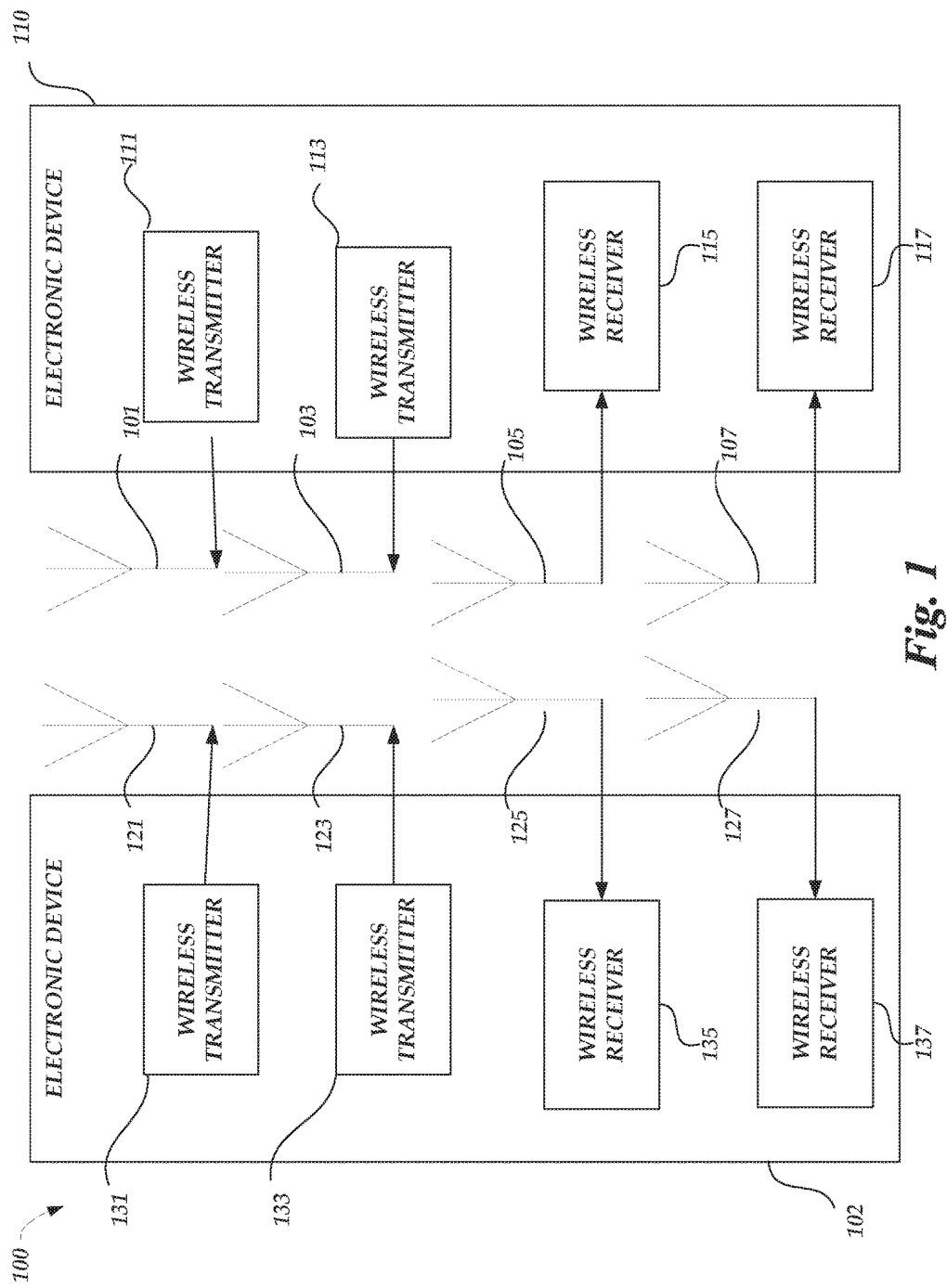
FIG. 1 is a schematic illustration of a system arranged in accordance with examples described herein.

Certain details are set forth below to provide a sufficient understanding of embodiments of the present disclosure. However, it will be clear to one skilled in the art that embodiments of the present disclosure may be practiced without various of these particular details. In some instances, well-known wireless communication components, circuits, control signals, timing protocols, computing system components, telecommunication components, and software operations have not been shown in detail in order to avoid unnecessarily obscuring the described embodiments of the present disclosure.

Full duplex communication may be desirable for a variety of devices. Full duplex communication generally may refer to an ability to both send and receive transmissions, in some cases simultaneously and/or partially simultaneously. In examples of systems employing full duplex communication, it may be desirable to cancel interference generated by other antennas in the system. Examples described herein may compensate for interference generated by other antennas co-located on the same physical device or system (e.g., interference created by an antenna on a MIMO device). In the example of frequency duplexing (FD), an antenna transmitting a transmission on a certain frequency band may create interference for an antenna, co-located on the same device, receiving a transmission on the same frequency band. Such interference may be referred to as self-interference. Self-interference may disrupt the accuracy of signals transmitted or received by the MIMO device. Examples described herein may compensate for self-interference at an electronic device, which may aid in achieving full complex transmission. A network of processing elements may be used to generate adjusted signals to compensate for self-interference generated by the antennas of the electronic device.

5G systems may advantageously make improved usage of full duplex transmission mode, for example, to improve spectrum efficiency. Frequency bands in some systems may be assigned by regulatory authorities such as the Federal Communication Commission (FCC). Assignments may be made, for example, according to different applications such as digital broadcasting and wireless communication. These licensed and assigned frequencies may be wasted if there is simply time-division duplex (TDD), frequency-division duplex (FDD) or half-duplex FDD mode, which are duplexing modes often used in existing wireless applications. Such modes may not be acceptable when improved efficiency is demanded from the wireless spectrum. Moreover, with the fast development of digital transmission and communications, there are fewer and fewer unlicensed frequency bands and it may be advantageous to use those licensed frequency bands in a full duplex transmission mode. For example, the FCC has officially proposed to open some UHF bands for unlicensed uses and is also considering how to use the frequency bands which are over 6 GHz (e.g. millimeter wave bands). Examples described herein may be utilized to achieve full duplex transmission in some examples on existing frequency bands including the aforementioned unlicensed frequency bands and 6 GHz bands. Full-duplex (FD) transmission may allow a wireless communication system to transmit and receive the signals, simultaneously, in the same frequency band. This may allow FD 5G systems to the spectrum efficiency of any frequency band.

Examples described herein include systems and methods which include wireless devices and systems with a self-interference noise calculator. The self-interference noise calculator may utilize a network of processing elements to generate a corresponding adjusted signal for self-interference that an antenna of the wireless device or system is expected to experience due to signals to be transmitted by another antenna of the wireless device or system. Such a network of processing elements may combine transmission signals to provide intermediate processing results that are summed, based on respective weights, to generate adjusted signals. A respective weight vector applied to the intermediate processing result may be based on an amount of interference expected for the respective transmission signal from the corresponding intermediate processing result. In some examples, a self-interference noise calculator may include bit manipulation units, multiplication processing units, and/or accumulation processing units. For example, the multiplication processing units may weight the intermediate processing results based on a minimized error for the all or some of the adjustment signals that may generated by a self-interference noise calculator. In minimizing the error for the adjustment signals, a wireless device or system may achieve full duplex transmission utilizing the self-interference noise calculator.

FIG. 1 is a schematic illustration of a system arranged in accordance with examples described herein. System 100 includes electronic device 102, electronic device 110, antenna 101, antenna 103, antenna 105, antenna 107, antenna 121, antenna 123, antenna 125, antenna 127, wireless transmitter 131, wireless transmitter 133, wireless receiver 135 and, wireless receiver 137. The electronic device 102 may include antenna 121, antenna 123, antenna 125, antenna 127, wireless transmitter 111, wireless transmitter 113, wireless receiver 115, and wireless receiver 117. The electronic device 110 may include antenna 101, antenna 103, antenna 105, and antenna 107. In operation, electronic devices 102, 110 can operate in a full duplex transmission mode between the respective antennas of each electronic device. In an example of a full duplex transmission mode, wireless transmitter 131 coupled to antenna 121 may transmit to antenna 105 coupled to wireless receiver 115, while, at the same time or during at least a portion of the same time, wireless transmitter 111 coupled to antenna 101 may transmit to antenna 127 coupled to wireless receiver 137, in some examples at a same frequency or in a same frequency band. Self-interference received by antenna 127 or antenna 105 from the respective transmissions at antenna 121 and antenna 101 may be compensated by the systems and methods described herein. Self-interference may generally refer to any wireless interference generated by transmissions from antennas of an electronic device to signals received by other antennas, or same antennas, on that same electronic device.

Electronic devices described herein, such as electronic device 102 and electronic device 110 shown in FIG. 1 may be implemented using generally any electronic device for which communication capability is desired. For example, electronic device 102 and/or electronic device 110 may be implemented using a mobile phone, smartwatch, computer (e.g. server, laptop, tablet, desktop), or radio. In some examples, the electronic device 102 and/or electronic device 110 may be incorporated into and/or in communication with other apparatuses for which communication capability is desired, such as but not limited to, a wearable device, a medical device, an automobile, airplane, helicopter, appliance, tag, camera, or other device.

While not explicitly shown in FIG. 1, electronic device 102 and/or electronic device 110 may include any of a variety of components in some examples, including, but not limited to, memory, input/output devices, circuitry, processing units (e.g. processing elements and/or processors), or combinations thereof.

The electronic device 102 and the electronic device 110 may each include multiple antennas. For example, the electronic device 102 and electronic device 110 may each have more than two antennas. Three antennas each are shown in FIG. 1, but generally any number of antennas may be used including 2, 3, 4, 5, 6, 7, 8, 9, 10, 11, 12, 13, 14, 15, 16, 32, or 64 antennas. Other numbers of antennas may be used in other examples. In some examples, the electronic device 102 and electronic device 110 may have a same number of antennas, as shown in FIG. 1. In other examples, the electronic device 102 and electronic device 104 may have different numbers of antennas. Generally, systems described herein may include multiple-input, multiple-output ("MIMO") systems. MIMO systems generally refer to systems including one or more electronic devices which transmit transmissions using multiple antennas and one or more electronic devices which receive transmissions using multiple antennas. In some examples, electronic devices may both transmit and receive transmissions using multiple antennas. Some example systems described herein may be "massive MIMO" systems. Generally, massive MIMO systems refer to systems employing greater than a certain number (e.g. 8) antennas to transmit and/or receive transmissions. As the number of antennas increase, so to generally does the complexity involved in accurately transmitting and/or receiving transmissions.

Although two electronic devices (e.g. electronic device 102 and electronic device 110) are shown in FIG. 1, generally the system 100 may include any number of electronic devices.

Electronic devices described herein may include receivers, transmitters, and/or transceivers. For example, the electronic device 102 of FIG. 1 includes wireless transmitter 131 and wireless receiver 135, and the electronic device 110 includes wireless transmitter 111 and wireless receiver 115. Generally, receivers may be provided for receiving transmissions from one or more connected antennas, transmitters may be provided for transmitting transmissions from one or more connected antennas, and transceivers may be provided for receiving and transmitting transmissions from one or more connected antennas. While both electronic devices 102, 110 are depicted in FIG. 1 with individual wireless transmitter and individual wireless receivers, it can be appreciated that a wireless transceiver may be coupled to antennas of the electronic device and operate as either a wireless transmitter or wireless receiver, to receive and transmit transmissions. For example, a transceiver of electronic device 102 may be used to provide transmissions to and/or receive transmissions from antenna 121, while other transceivers of electronic device 110 may be provided to provide transmissions to and/or receive transmissions from antenna 101 and antenna 103. Generally, multiple receivers, transmitters, and/or transceivers may be provided in an electronic device—one in communication with each of the antennas of the electronic device. The transmissions may be in accordance with any of a variety of protocols, including, but not limited to 5G signals, and/or a variety of modulation/demodulation schemes may be used, including, but not limited to: orthogonal frequency division multiplexing (OFDM), filter bank multi-carrier (FBMC), the generalized frequency division multiplexing (GFDM), universal filtered multi-carrier (UFMC) transmission, hi orthogonal frequency division multiplexing (BFDM), sparse code multiple access (SCMA), non-orthogonal multiple access (NOMA), multi-user shared access (MUSA) and faster-than-Nyquist (FTN) signaling with time-frequency packing. In some examples, the transmissions may be sent, received, or both, in accordance with 5G protocols and/or standards.

Examples of transmitters, receivers, and/or transceivers described herein, such as the wireless transmitter 131 and the wireless transmitter 111 may be implemented using a variety of components, including, hardware, software, firmware, or combinations thereof. For example, transceivers, transmitters, or receivers may include circuitry and/or one or more processing units (e.g. processors) and memory encoded with executable instructions for causing the transceiver to perform one or more functions described herein (e.g. software).

Figure 2:
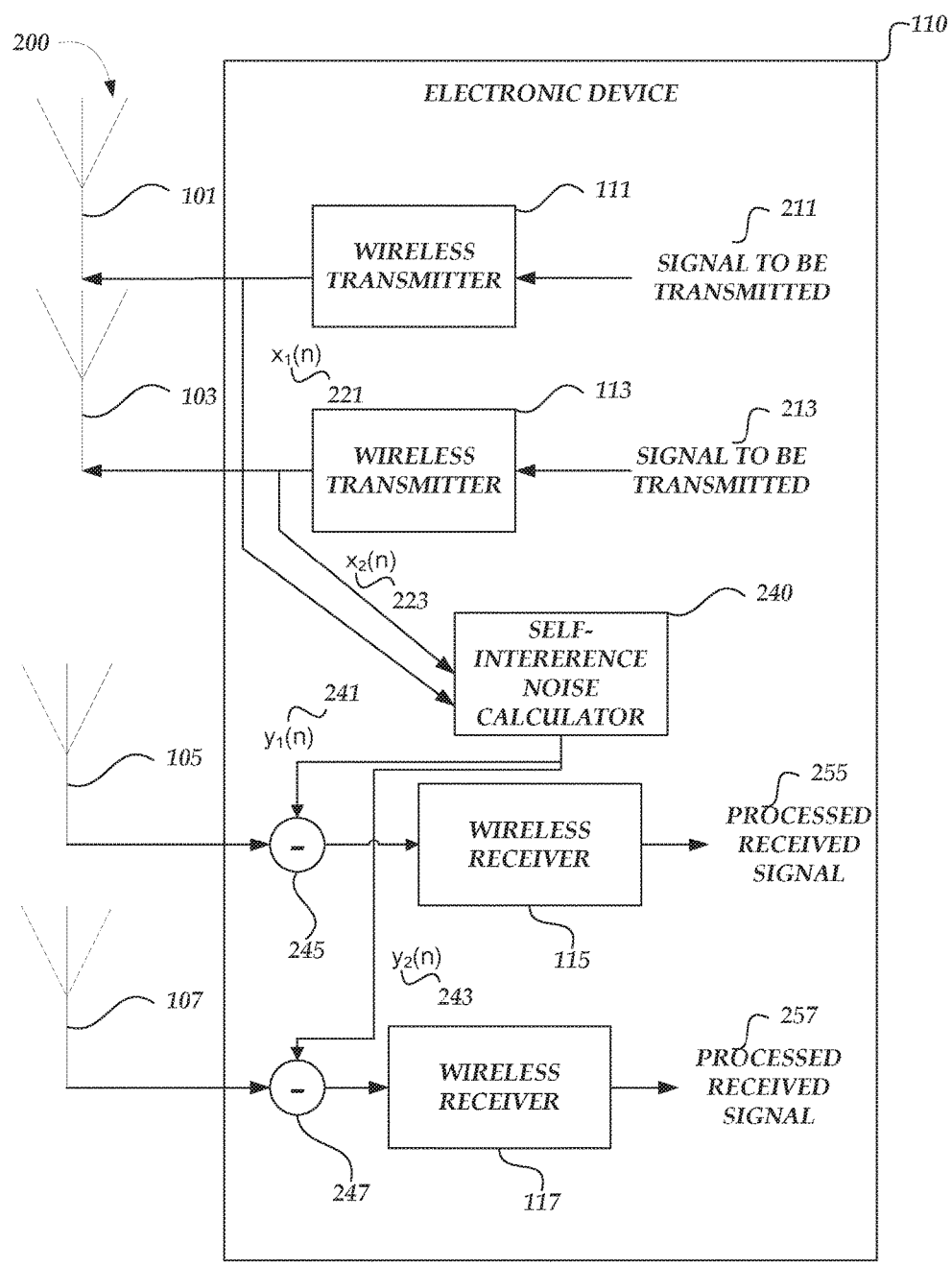
FIG. 2 is a schematic illustration of an electronic device arranged in accordance with examples described herein.

FIG. 2 is a schematic illustration 200 of an electronic device 110 arranged in accordance with examples described herein. The electronic device 110 may also include self-interference noise calculator 240, compensation component 245, and compensation component 247. Self-interference noise calculator 240 and wireless transmitter 111, 113 may be in communication with one another. Each wireless transmitter 111, 113 may be in communication with a respective antenna, such as antenna 101, antenna 103. Each wireless transmitter 111, 113 receives a respective signal to be transmitted, such as signals to be transmitted 211, 213. The wireless receivers 115, 117 may process the signals to be transmitted 211, 213 with the operations of a radio-frequency (RF) front-end to generate transmitter output data $x_1(n)$, $x_2(n)$ 221, 223. The wireless transmitter 111, 113 may process the signals to be transmitted 211, 213 as a wireless transmitter 300, for example.

Self-interference noise calculator 240 and compensation components 245, 247 may be in communication with one another. Each wireless receiver may be in communication with a respective antenna, such as antenna 105, 107 and a respective compensation component, such as compensation component 245, 247. In some examples, a wireless transmission received at antennas 105, 107 may be communicated to wireless receiver 115, 117 after compensation of self-interference by the respective compensation component 245. 247. Each wireless receiver 115, 117 processes the received and compensated wireless transmission to produce a respective processed received signal, such as processed received signals 255, 257. In other examples, fewer, additional, and/or different components may be provided.

Examples of self-interference noise calculators described herein may generate and provide adjusted signals to compensation components. So, for example, the self-interference noise calculator 240 may generate adjusted signals $y_1(n)$, $y_2(n)$ 241, 243 and provide such adjusted signals to the compensation components 245, 247. The self-interference noise calculator 240 may generate such adjusted signals $y_1(n)$, $y_2(n)$ 241, 243 based on transmitter output data $x_1(n)$, $x_2(n)$ 221, 223. The self-interference noise calculator 240 may be in communication with multiple (e.g. all) of the wireless transmitters of the electronic device 110 and all the respective compensation components coupled to respective wireless receivers, and may provide adjusted signals based on transmitter output data.

It may be desirable in some examples to compensate for the self-interference noise to achieve full duplex transmission. For example, it may be desirable for wireless transmitters 111,113 of the electronic device 110 to transmit wireless transmission signals at a certain frequency band; and, at the same time or simultaneously, wireless receivers 105, 107 receive wireless transmission signals on that same frequency band. The self-interference noise calculator 240 may determine the self-interference contributed from each wireless transmission based on the transmitter output data to compensate each received wireless transmission with an adjusted signal $y_1(n)$, $y_2(n)$ 241, 243. Particularly as wireless communications move toward 5G standards, efficient use of wireless spectra may become increasingly important.

Examples of self-interference noise calculators described herein may provide the adjusted signals $y_1(n)$, $y_2(n)$ 241, 243 to receiver(s) and/or transceiver(s). Compensation components 245, 247 may receive the adjusted signals $y_1(n)$, $y_2(n)$ 241, 243 and compensate an incoming received wireless transmission from antennas 105, 107, For example, the compensation components 245, 247 may combine the adjusted signals with the incoming received wireless transmission in a manner which compensates for (e.g. reduces) self-interference. In some examples, the compensation components 245, 247 may subtract the adjusted signals $y_1(n)$, $y_2(n)$ 241, 243 from the received wireless transmission to produce compensated received signals for the respective wireless receivers 115, 117. The compensation components 245, 247 may communicate the compensated received signals to the wireless receivers 115, 117. The wireless receivers 115, 117 may process the compensated received signal with the operations of a radio-frequency (RF) front-end. The wireless receiver may process the compensated received signals as a wireless receiver 400, for example. While the compensation components 245, 247 have been described in terms of subtracting an adjusting signal from a received wireless transmission, it can be appreciated that various compensations may be possible, such as adjusted signal that operates as a transfer function compensating the received wireless transmission or an adjusted signal that operates as an optimization vector to multiply the received wireless transmission. Responsive to such compensation, electronic device 110 may transmit and receive wireless communications signals in a full duplex transmission mode.

Examples of self-interference noise calculators described herein, including the self-interference noise calculator 240 of FIG. 2 may be implemented using hardware, software, firmware, or combinations thereof. For example, self-interference noise calculator 240 may be implemented using circuitry and/or one or more processing unit(s) (e.g. processors) and memory encoded with executable instructions for causing the self-interference noise calculator to perform one or more functions described herein.

Figure 3:
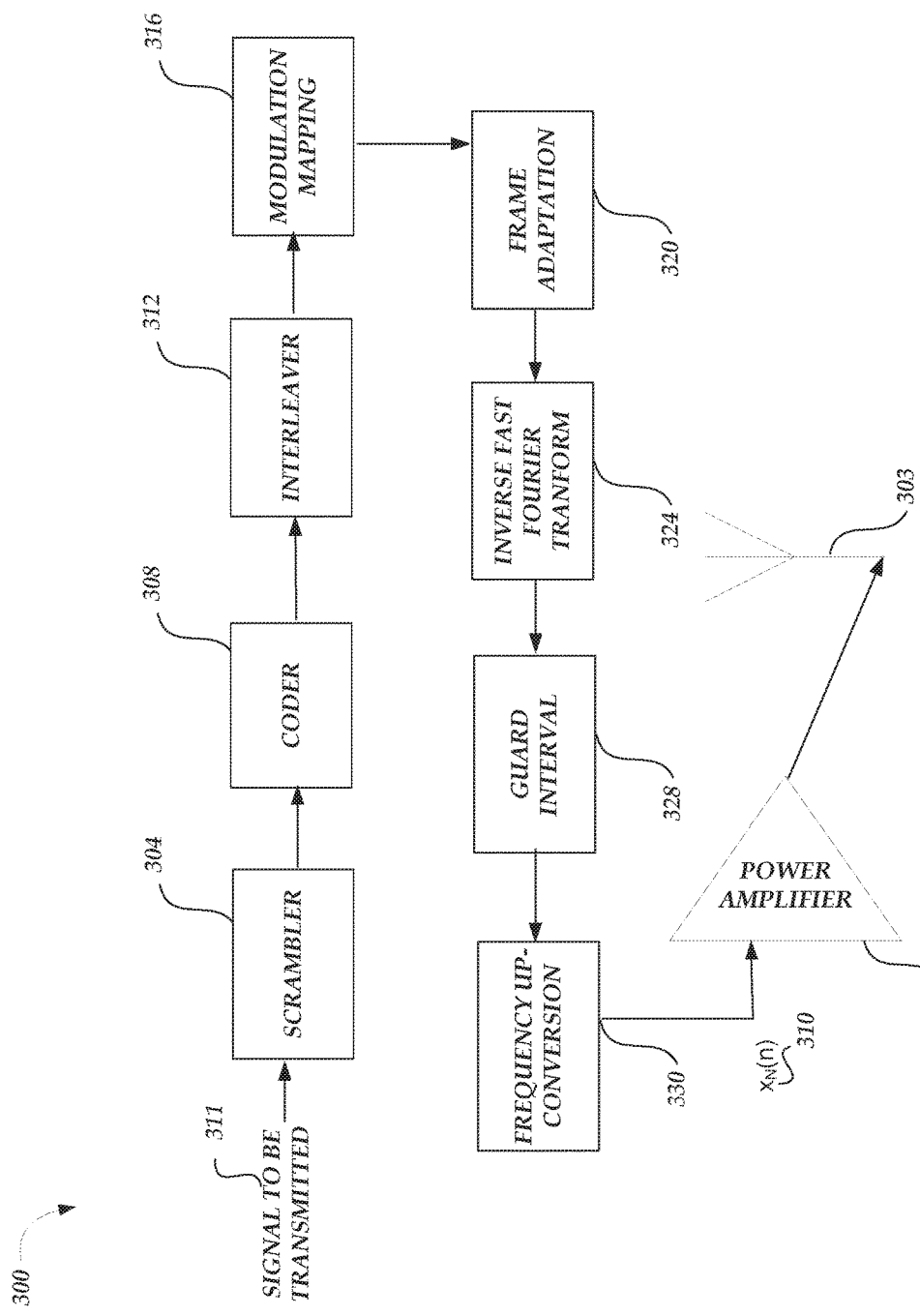
FIG. 3 is a schematic illustration of a wireless transmitter.

FIG. 3 is a schematic illustration of a wireless transmitter 300. The wireless transmitter 300 receives a signal to be transmitted 311 and performs operations of an RF-front end to generate wireless communication signals for transmission via the antenna 303. The wireless transmitter 300 may be utilized to implement the wireless transmitters 111, 113 in FIGS. 1, 2, and 6 or wireless transmitters 131, 133 of FIG. 1, for example. The transmitter output data $x_N(n)$ 310 is amplified by a power amplifier 332 before the output data are transmitted on an RF antenna 336. The operations of the RF-front end may generally be performed with analog circuitry or processed as a digital baseband operation for implementation of a digital front-end. The operations of the RF-front end include a scrambler 304, a coder 308, an interleaver 312, a modulation mapping 316, a frame adaptation 320, an IFFT 324, a guard interval 328, and frequency up-conversion 330.

The scrambler 304 converts the input data to a pseudo-random or random binary sequence. For example, the input data may be a transport layer source (such as MPEG-2 Transport stream and other data) that is converted to a Pseudo Random Binary Sequence (PRBS) with a generator polynomial. While described in the example of a generator polynomial, various scramblers 304 are possible. The coder 308 may encode the data outputted from the scrambler to code the data. For example, a Reed-Solomon (RS) encoder or turbo encoder may be used as outer coder to generate a parity block for each randomized transport packet fed by the scrambler 304. In some examples, the length of parity block and the transport packet can vary according to various wireless protocols. The interleaver 312 may interleave the parity blocks output by the coder 308, for example, the interleaver 312 may utilize convolutional byte interleaving. In some examples, additional coding and interleaving can be performed after the coder 308 and interleaver 312. For example, additional coding may include an inner coder that may further code data output from the interleaver, for example, with a punctured convolutional coding having a certain constraint length. Additional interleaving may include an inner interleaver that forms groups of joined blocks. While described in the context of a RS coding, turbocoding, and punctured convolution coding, various coders 308 are possible, such as a low-density parity-check (LDPC) coder or a polar coder. While described in the context of convolutional byte interleaving, various interleavers 312 are possible.

The modulation mapping 316 modulates the data outputted from the interleaver 312. For example, quadrature amplitude modulation (QAM) can map the data by changing (e.g., modulating) the amplitude of the related carriers. Various modulation mappings can be possible, including, but not limited to: Quadrature Phase Shift Keying (QPSK), SCMA NOMA, and MUSA (Multi-user Shared Access). Output from the modulation mapping 316 may be referred to as data symbols. While described in the context of QAM modulation, various modulation mappings 316 are possible. The frame adaptation 320 may arrange the output from the modulation mapping according to bit sequences that represent corresponding modulation symbols, carriers, and frames.

The IFFT 324 may transform symbols that have been framed into sub-carriers (e.g., by frame adaptation 320) into time-domain symbols. Taking an example of a 5G wireless protocol scheme, the IFFT can be applied as N-point IFFT:

$$x_k = \sum_{n=1}^{N} X_n e^{i 2\pi k n / N} \qquad (1)$$

where $X_n$ is the modulated symbol sent in the nth 5G sub-carrier. Accordingly, the output of the IFFT 324 may form time-domain 5G symbols. In some examples, the IFFT 324 may be replaced by a pulse shaping filter or poly-phase filtering banks to output symbols for frequency up-conversion 330. The guard interval 328 adds a guard interval to the time-domain 5G symbols. For example, the guard interval may be a fractional length of a symbol duration that is added, to reduce inter-symbol interference, by repeating a portion of the end of a time-domain 5G symbol at the beginning of the frame. For example, the guard interval can be a time period corresponding to the cyclic prefix portion of the 5G wireless protocol scheme. The frequency up-conversion 330 may up-convert the time-domain 5G symbols to a specific radio frequency. For example, the time-domain 5G symbols can be viewed as a baseband frequency range and a local oscillator can mix the frequency at which it oscillates with the 5G symbols to generate 5G symbols at the oscillation frequency. A digital up-converter (DUC) may also be utilized to convert the time-domain 5G symbols. Accordingly, the 5G symbols can be up-converted to a specific radio frequency for an RF transmission. Before transmission, at the antenna 303, a power amplifier 332 may amplify the transmitter output data $x_N(n)$ 310 to output data for an RF transmission in an RF domain at the antenna 336. The antenna 336 may be an antenna designed to radiate at a specific radio frequency. For example, the antenna 336 may radiate at the frequency at which the 5G symbols were up-converted. Accordingly, the wireless transmitter 300 may transmit an RF transmission via the antenna 336 based on the signal to be transmitted 311 received at the scrambler 304. As described above with respect to FIG. 3, the operations of the wireless transmitter 300 can include a variety of processing operations. Such operations can be implemented in a conventional wireless transmitter, with each operation implemented by specifically-designed hardware for that respective operation. For example, a DSP processing unit may be specifically-designed to implement the IFFT 324. As can be appreciated, additional operations of wireless transmitter 300 may be included in a conventional wireless receiver.

Figure 4:
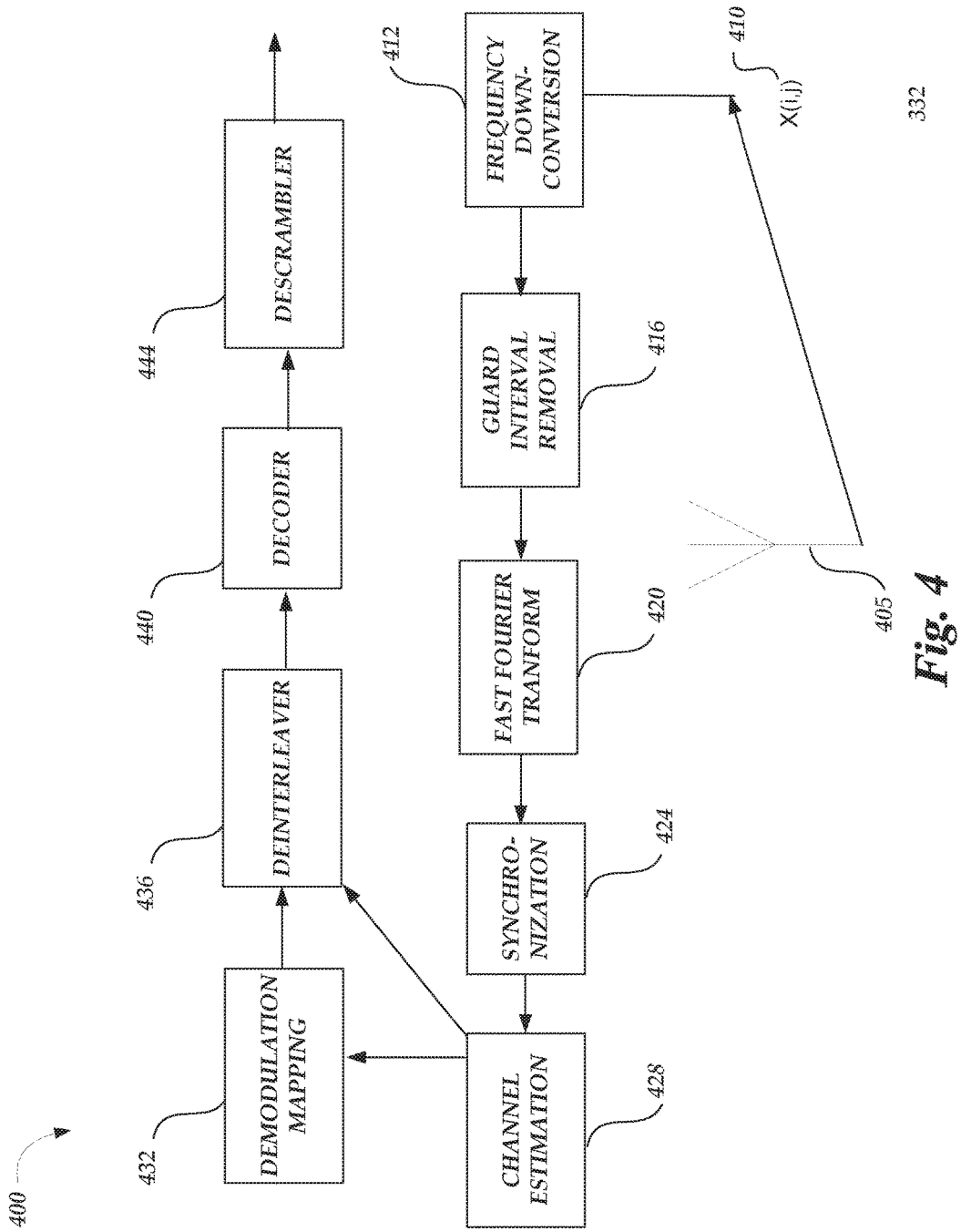
FIG. 4 is a schematic illustration of wireless receiver.

FIG. 4 is a schematic illustration of wireless receiver 400. The wireless receiver 400 receives input data X (i,j) 410 from an antenna 404 and performs operations of a RF wireless receiver to generate receiver output data at the descrambler 444. The wireless receiver 400 may be utilized to implement the wireless receivers 115, 117 in FIGS. 1, 2, and 6, for example or wireless receivers 135, 137 of FIG. 1. The antenna 404 may be an antenna designed to receive at a specific radio frequency. The operations of the RF wireless receiver may be performed with analog circuitry or processed as a digital baseband operation for implementation of a digital front-end. The operations of the RF wireless receiver include a frequency down-conversion 412, guard interval removal 416, a fast Fourier transform 420, synchronization 424, channel estimation 428, a demodulation mapping 432, a deinterleaver 436, a decoder 440, and a descrambler 444.

The frequency down-conversion 412 may down-convert the frequency domain symbols to a baseband processing range. For example, continuing in the example of a 5G implementation, the frequency-domain 5G symbols may be mixed with a local oscillator frequency to generate 5G symbols at a baseband frequency range. A digital down-converter (DDC) may also be utilized to convert the frequency domain symbols. Accordingly, the RF transmission including time-domain 5G symbols may be down-converted to baseband. The guard interval removal 416 may remove a guard interval from the frequency-domain 5G symbols. The FFT 420 may transform the time-domain 5G symbols into frequency-domain 5G symbols. Taking an example of a 5G wireless protocol scheme, the FFT can be applied as N-point FFT:

$$X_n = \sum_{k=1}^{N} x_k e^{-i 2\pi k n / N} \qquad (2)$$

where $X_n$ is the modulated symbol sent in the nth 5G sub-carrier. Accordingly, the output of the FFT 420 may form frequency-domain 5G symbols. In some examples, the FFT 420 may be replaced by poly-phase filtering banks to output symbols for synchronization 424.

The synchronization 424 may detect pilot symbols in the 5G symbols to synchronize the transmitted data. In some examples of a 5G implementation, pilot symbols may be detected at the beginning of a frame (e.g., in a header) in the time-domain. Such symbols can be used by the wireless receiver 400 for frame synchronization. With the frames synchronized, the 5G symbols proceed to channel estimation 428. The channel estimation 428 may also use the time-domain pilot symbols and additional frequency-domain pilot symbols to estimate the time or frequency effects (e.g., path loss) to the received signal. For example, a channel may be estimated based on N signals received through N antennas (in addition to the antenna 404) in a preamble period of each signal. In some examples, the channel estimation 428 may also use the guard interval that was removed at the guard interval removal 416. With the channel estimate processing, the channel estimation 428 may compensate for the frequency-domain 5G symbols by some factor to minimize the effects of the estimated channel. While channel estimation has been described in terms of time-domain pilot symbols and frequency-domain pilot symbols, other channel estimation techniques or systems are possible, such as a MIMO-based channel estimation system or a frequency-domain equalization system. The demodulation mapping 432 may demodulate the data outputted from the channel estimation 428. For example, a quadrature amplitude modulation (QAM) demodulator can map the data by changing (e.g., modulating) the amplitude of the related carriers. Any modulation mapping described herein can have a corresponding demodulation mapping as performed by demodulation mapping 432. In some examples, the demodulation mapping 432 may detect the phase of the carrier signal to facilitate the demodulation of the 5G symbols. The demodulation mapping 432 may generate bit data from the 5G symbols to be further processed by the deinterleaver 436.

The deinterleaver 436 may deinterleave the data bits, arranged as parity block from demodulation mapping into a bit stream for the decoder 440, for example, the deinterleaver 436 may perform an inverse operation to convolutional byte interleaving. The deinterleaver 436 may also use the channel estimation to compensate for channel effects to the parity blocks. The decoder 440 may decode the data outputted from the scrambler to code the data. For example, a Reed-Solomon (RS) decoder or turbo decoder may be used as a decoder to generate a decoded bit stream for the descrambler 444. For example, a turbo decoder may implement a parallel concatenated decoding scheme. In some examples, additional decoding deinterleaving may be performed after the decoder 440 and deinterleaver 436. For example, additional coding may include an outer coder that may further decode data output from the decoder 440. While described in the context of a RS decoding and turbo decoding, various decoders 440 are possible, such as low-density parity-check (LDPC) decoder or a polar decoder. The descrambler 444 may convert the output data from decoder 440 from a pseudo-random or random binary sequence to original source data. For example, the descrambler 444 may convert decoded data to a transport layer destination (e.g., MPEG-2 transport stream) that is descrambled with an inverse to the generator polynomial of the scrambler 304. The descrambler thus outputs receiver output data. Accordingly, the wireless receiver 400 receives an RF transmission including input data X (i,j) 410 via to generate the receiver output data.

As described above with respect to FIG. 4, the operations of the wireless receiver 400 can include a variety of processing operations. Such operations can be implemented in a conventional wireless receiver, with each operation implemented by specifically-designed hardware for that respective operation. For example, a DSP processing unit may be specifically-designed to implement the FFT 420. As can be appreciated, additional operations of wireless receiver 400 may be included in a conventional wireless receiver.

Figure 5:
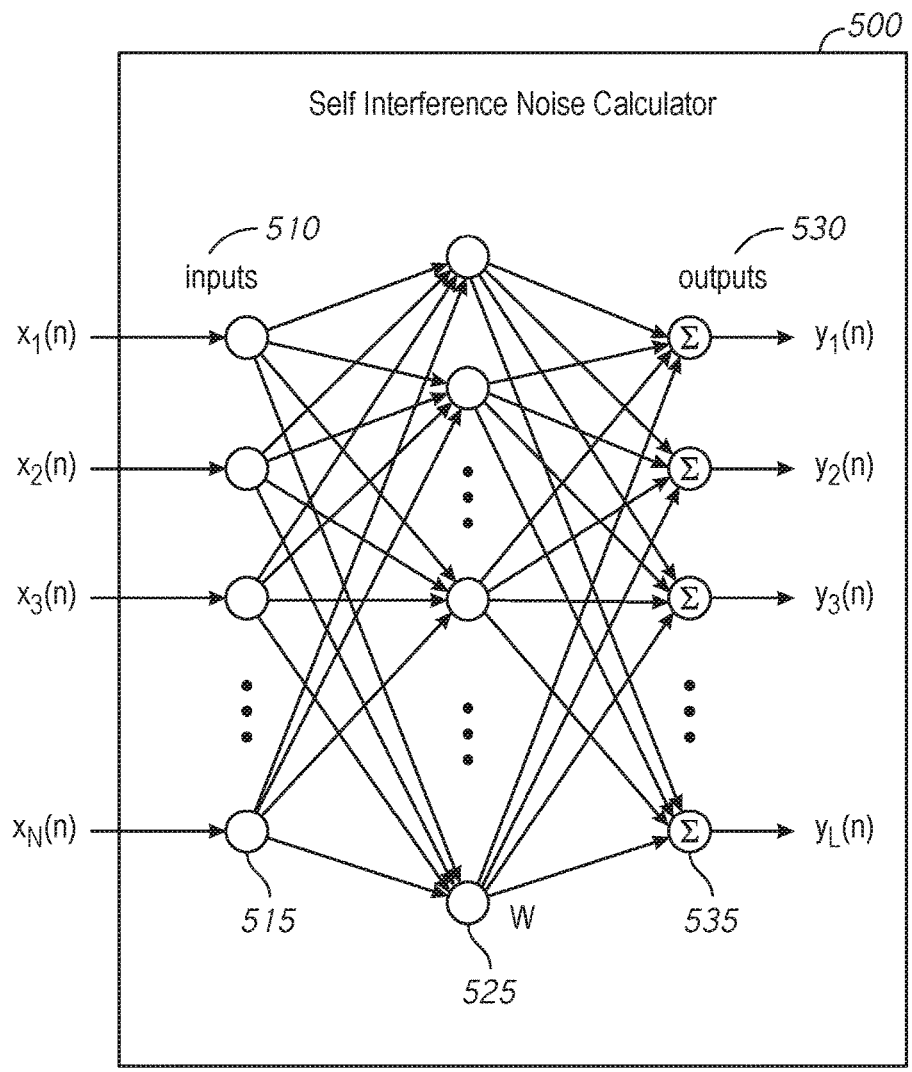
FIG. 5 is a schematic illustration of an example self-interference noise calculator arranged in accordance with examples described herein.

FIG. 5 is a schematic illustration of an example self-interference noise calculator 500 arranged in accordance with examples described herein. The self-interference noise calculator 500 may be utilized to implement the self-interference noise calculator of FIG. 2 or the self-interference noise calculator 640 of FIG. 6, for example. The self-interference noise calculator 500 includes a network of processing elements 515, 525, 535 that output adjusted signals $y_1(n)$, $y_2(n)$, $y_3(n)$, $y_L(n)$ 530 based on transmitter output data $x_1(n)$, $x_2(n)$, $x_3(n)$, $x_N(n)$ 510. For example, the transmitter output data $x_1(n)$, $x_2(n)$, $x_3(n)$, $x_N(n)$ 510 may correspond to inputs for respective antennas of each transmitter generating the respective $x_1(n)$, $x_2(n)$, $x_3(n)$, $x_N(n)$ 510. The processing elements 515 receive the transmitter output data $x_1(n)$, $x_2(n)$, $x_3(n)$, $x_N(n)$ 510 as inputs. The processing elements 515 may be implemented, for example, using bit manipulation units that may forward the transmitter output data $x_1(n)$, $x_2(n)$, $x_3(n)$, $x_N(n)$ 510 to processing elements 525. Processing elements 525 may be implemented, for example, using multiplication units that include a non-linear vector set (e.g., center vectors) based on a non-linear function, such as a Gaussian function (e.g., $$f(r) = \exp\left(-\frac{r^2}{\sigma^2}\right),$$

a multi-quadratic function (e.g., $f(r)=(r^2+\sigma^2)$), an inverse multi-quadratic function (e.g., $f(r)=(r^2=\sigma^2)$), a thin-plate spine function (e.g., $f(r)=r^2\log(r)$), a piece-wise linear function (e.g., $f(r)=\frac{1}{2}(|r+1|-|r-1|)$, or a cubic approximation function (e.g., $f(r)=\frac{1}{2}(|r^3+1|-|r^3-1|)$). In some examples, the parameter σ is a real parameter (e.g., a scaling parameter) and r is the distance between the input signal (e.g., $x_1(n)$, $x_2(n)$, $x_3(n)$, $x_N(n)$ 510) and a vector of the non-linear vector set. Processing elements 535 may be implemented, for example, using accumulation units that sum the intermediate processing results received from each of the processing elements 525. In communicating the intermediate processing results, each intermediate processing result may be weighted with a weight 'W'. For example, the multiplication processing units may weight the intermediate processing results based on a minimized error for the all or some of the adjustment signals that may generated by a self-interference noise calculator.

The processing elements 525 include a non-linear vector set that may be denoted as $C_i$ (for i=1, 2, ..., H). H may represent the number of processing elements 525. With the transmitter output data $x_1(n)$, $x_2(n)$, $x_3(n)$, $x_N(n)$ 510 received as inputs to processing elements 525, after forwarding by processing elements 515, the output of the processing elements 525, operating as multiplication processing units, may be expressed as $h_i(n)$, such that:

$$h_i(n)=f_i(\|X(n)-C_i\|)(i=1, 2, \ldots, H) \quad (3)$$

$f_i$ may represent a non-linear function that is applied to the magnitude of the difference between $x_1(n)$, $x_2(n)$, $x_3(n)$, $x_N(n)$ 510 and the center vectors $C_i$. The output $h_i(n)$ may represent a non-linear function such as a Gaussian function, multi-quadratic function, an inverse multi-quadratic function, a thin-plate spine function, or a cubic approximation function.

The output $h_i(n)$ of the processing elements 525 may be weighted with a weight matrix 'W'. The output $h_i(n)$ of the processing elements 525 can be referred to as intermediate processing results of the self-interference noise calculator 500. For example, the connection between the processing elements 525 and processing elements 535 may be a linear function such that the summation of a weighted output $h_i(n)$ such that the adjusted signals $y_1(n)$, $y_2(n)$, $y_3(n)$, $y_L(n)$ 530 may be expressed, in Equation 4 as:

$$y_i(n)=\Sigma_{j=1}^H W_{ij} h_j(n)=\Sigma_{j=1}^H W_{ij} f_j(\|X(n)-C_j\|)$$
$$(i=1, 2, \ldots, L) \quad (4)$$

Accordingly, the adjusted signals $y_1(n)$, $y_2(n)$, $y_3(n)$, $y_L(n)$ 530 may be the output $y_i(n)$ of the i'th processing element 535 at time n, where L is the number of processing elements 535. $W_{ij}$ is the connection weight between j'th processing element 525 and i'th processing element 535 in the output layer. As described with respect to FIG. 6, the center vectors $C_i$ and the connection weights $W_{ij}$ of each layer of processing elements may be determined by a training unit 650 that utilizes sample vectors 660 to train a self-interference calculator 640. Advantageously, the adjusted signals $y_1(n)$, $y_2(n)$, $y_3(n)$, $y_L(n)$ 530 generated from the transmitter output data $x_1(n)$, $x_2(n)$, $x_3(n)$, $x_N(n)$ 510 may be computed with near-zero latency such that self-interference compensation may be achieved in any electronic device including a self-interference noise calculator, such as the self-interference noise calculator 500. A wireless device or system that implements a self-interference noise calculator 500 may achieve full duplex transmission. For example, the adjusted signals generated by the interference noise calculator 500 may compensate-interference that an antenna of the wireless device or system will experience due to signals to be transmitted by another antenna of the wireless device or system.

While the self-interference noise calculator 500 has been described with respect to a single layer of processing elements 525 that include multiplication units, it can be appreciated that additional layers of processing elements with multiplication units may be added between the processing elements 515 and the processing elements 535. The self-interference noise calculator is scalable in hardware form, with additional multiplication units being added to accommodate additional layers. Using the methods and systems described herein, additional layer(s) of processing elements including multiplication processing units and the processing elements 525 may be optimized to determine the center vectors $C_i$ and the connection weights $W_{ij}$ of each layer of processing elements including multiplication units.

The self-interference noise calculator 500 can be implemented using one or more processors, for example, having any number of cores. An example processor core can include an arithmetic logic unit (ALU), a bit manipulation unit, a multiplication unit, an accumulation unit, an adder unit, a look-up table unit, a memory look-up unit, or any combination thereof. In some examples, the self-interference noise calculator 240 may include circuitry, including custom circuitry, and/or firmware for performing functions described herein. For example, circuitry can include multiplication unit, accumulation units, and/or bit manipulation units for performing the described functions, as described herein. The self-interference noise calculator 240 may be implemented in any type of processor architecture including but not limited to a microprocessor or a digital signal processor (DSP), or any combination thereof.

Figure 6:
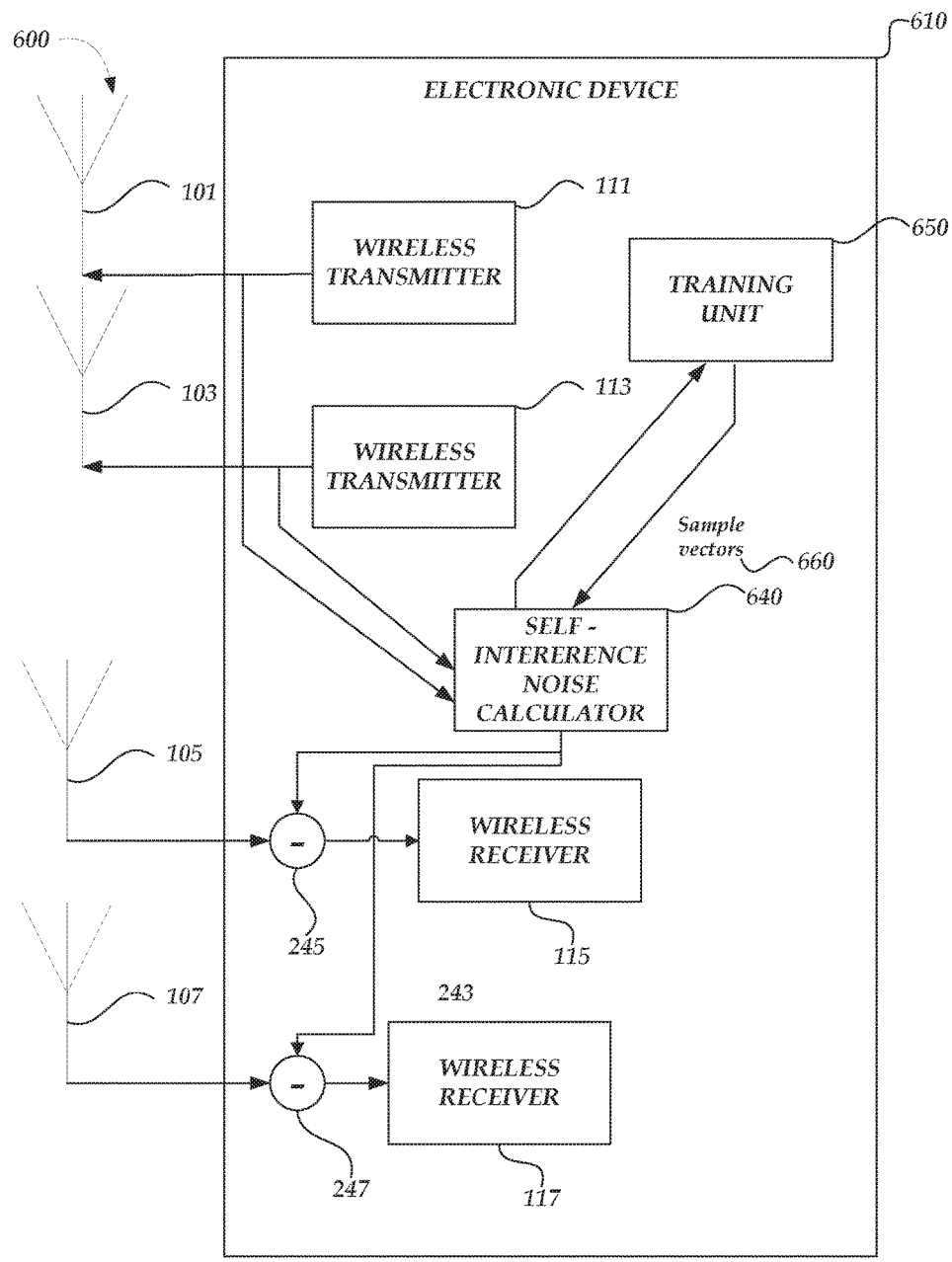
FIG. 6 is a schematic illustration of an electronic device arranged in accordance with examples described herein

FIG. 6 is a schematic illustration 600 of an electronic device 610 arranged in accordance with examples described herein. The electronic device 610 includes antennas 101, 103, 105, 107; wireless transmitters 111, 113; wireless receivers 115, 117; and compensation components 245, 247, which may operate in a similar fashion as described with reference to FIG. 2. The electronic device 610 also includes the self-interference noise calculator 640 and training unit 650 that may provide sample vectors 660 to the self-interference noise calculator 640. The self-interference noise calculator 500 may be utilized to implement the self-interference noise calculator 640, for example. The training unit may determine center vectors $C_i$ and the connection weights $W_{ij}$, for example, by optimizing the minimized error of adjusted signals (e.g., adjusted signals 530 $y_i(n)$ of FIG. 5). For example, an optimization problem can be solved utilizing a gradient descent procedure that computes the error, such that the minimized error may be expressed as:

$$E = \Sigma_{n=1}^{M} \|Y(n) - \widetilde{Y(n)}\|^2 \quad (5)$$

$\widetilde{Y(n)}$ may be a corresponding desired output vector. To solve this minimization problem, the training unit 650 may utilize sample vectors to determine the center vectors $C_i$ and the connection weights $W_{ij}$.

To determine the center vectors $C_i$, the training unit 650 may perform a cluster analysis (e.g., a k-means cluster algorithm) to determine at least one center vector among a corresponding set of vectors, such as sample vectors 660 based on training points or random vectors. In the sample vector approach, a training point may be selected towards the center for each of the sample vectors 660. The training point may be center of each cluster partition of a set of the sample vectors 660, such that optimizing the cluster center is expressed as minimized error away from the cluster center for a given training point in the cluster partition. Such a relationship may be expressed as:

$$E_{k\_means} = \Sigma_{j=1}^{H} \Sigma_{n=1}^{M} B_{jn} \|X(n) - C_j\|^2 \quad (6)$$

where $B_{jn}$ is the cluster partition or membership function forming an H×M matrix. Each column of H×M matrix represents an available sample vector and each row of H×M matrix represents a cluster. Each column may include a single "1" in the row corresponding to the cluster nearest to that training point and zeroes in the other entries of that column. The training unit 650 may initialize the center of each cluster to a different randomly chosen training point. Then each training example is assigned by the training unit 650 to a processing element (e.g., a processing element 525) nearest to it. When all training points have been assigned by the training unit 650, the training unit 650 finds the average position of the training point for each cluster and moves the cluster center to that point, when the error away from the cluster center for each training point is minimized, denoting the set of center vectors $C_i$ for the processing elements (e.g., the processing elements 525).

To determine the connection weights $W_{ij}$ for the connections between processing elements 525 and processing elements 535, the training unit 650 may utilize a linear least-squares optimization according to a minimization of the weights expressed as:

$$\min_{W} \sum_{n=1}^{M} \|Y(n) - \widetilde{Y(n)}\|^2 = \min_{W} \|WF - \hat{Y}\|^2 \quad (7)$$

where $W = \{W_{ij}\}$ is the L×H matrix of the connection weights, F is an H×M matrix comprising the outputs $h_i(n)$ of the processing elements 525, expressed in Equation 3. $\widetilde{Y(n)}$ may be a corresponding desired output matrix, with an L×M size. Accordingly, in matrix algebra form, connection weight matrix W may be expressed as $$W = \widetilde{Y} F^+ = \widetilde{Y} \lim_{\alpha \to 0} F^T (FF^T + \alpha I)^{-1} \quad (8)$$

where $F^+$ is the pseudo-inverse of F.

In some examples, for example in the context of self-interference calculator 500 implemented as self-interference noise calculator 640, to determine the connection weights $W_{ij}$ for the connections between processing elements 525 and processing elements 535, a training unit 650 may utilize a batch-processing embodiment where sample sets are readily available (e.g., available to be retrieved from a memory). The training unit 650 may randomly initialize the connection weights in the connection weight matrix W. The output vector Y(n) may be computed in accordance with Equation 4. An error term $e_i(n)$ may be computed for each processing element 525, which may be expressed as:

$$e_i(n) = y_i(n) = \widetilde{y}_i(n)(i=1, 2, \ldots, L) \quad (9)$$

where $\widetilde{y}_i(n)$ is a corresponding desired output vector. The connection weights may be adjusted in the batch-processing embodiment in accordance with a machine learning expression where a γ is the learning-rate parameter which could be fixed or time-varying. In the example, the machine learning expression may be:

$$W_{ij}(n+1) = W_{ij}(n) + \gamma e_u(n) f_j(\|X(n) - C_i\|)(i=1, 2, \ldots, L; \\ j=1, 2, \ldots, M) \quad (10)$$

Such a process may iterate until passing a specified error threshold. In the example, the total error may be expressed as:

$$\epsilon = \|Y(n) - \overline{Y(n)}\|^2$$

Accordingly, the training unit 650 may iterate recursively the process described herein until the error $\epsilon$ passes the specified error threshold, such as passing below the specified error threshold.

In some examples, when the training unit 650 is determining the center vectors $C_i$ that are a non-linear set of vectors fitting a Gaussian function, a scaling factor σ may be required before determination of the connection weights $W_{ij}$ for the connections between processing elements 525 and processing elements 535 of a self-interference calculator 500 implemented as self-interference calculator 640. In a Gaussian function example, a convex hull of the vectors $C_i$ may be required such that the training points allow a smooth fit for the output of the processing elements 525. Accordingly, each center vector $C_i$ may be related to another center vector $C_i$ of the processing elements 525, such that each center vector $C_i$ activates another center vector $C_i$ when computing the connection weights. A scaling factor may be based on heuristic that computes the P-nearest neighbor, such that:

$$\sigma_i = 1/P \sum_{j=1}^{P} \|C_j - C_i\|^2 (i=1, 2, \ldots, H)$$

where $C_j$ (for i=1, 2, ..., H) are the P-nearest neighbors of $C_i$.

Figure 7:
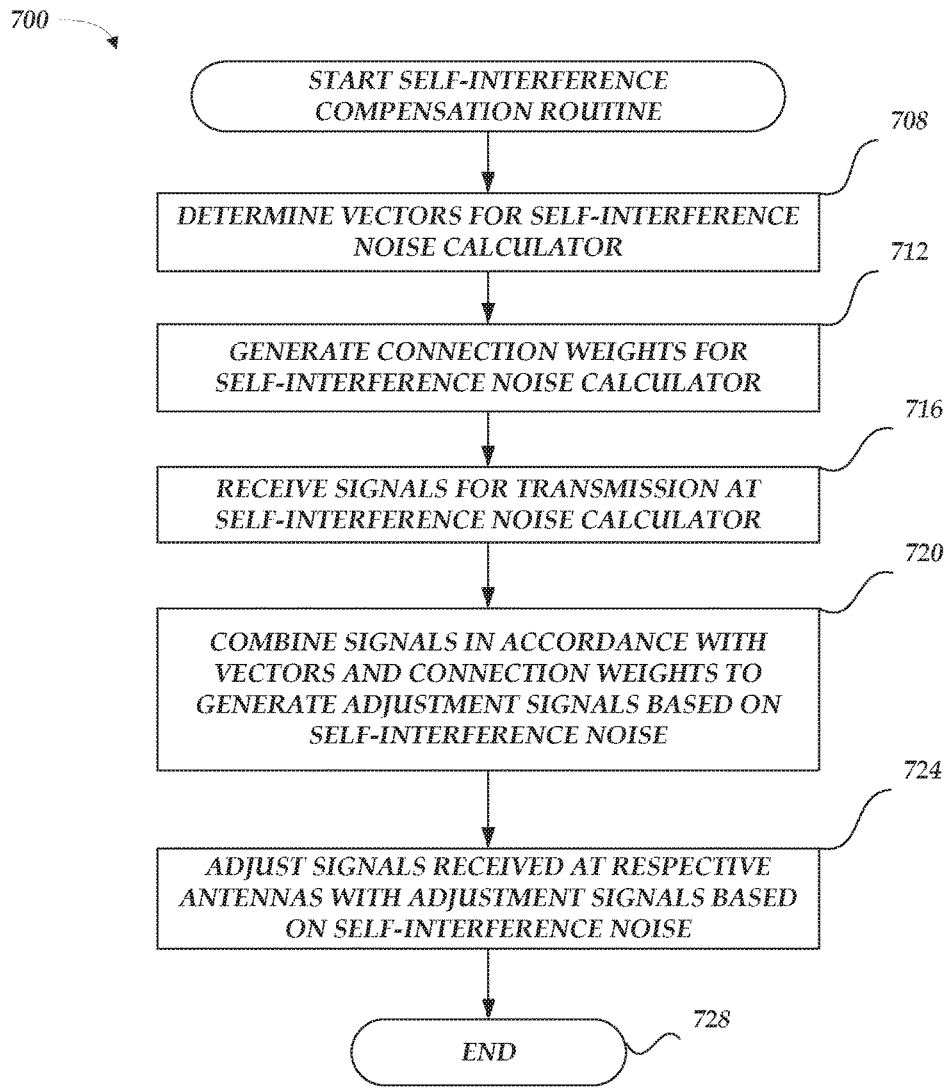
FIG. 7 is a schematic illustration of a full duplex compensation method in accordance with examples described herein.

FIG. 7 is a schematic illustration of a full duplex compensation method 700 in accordance with examples described herein. Example method 700 may be implemented using, for example, electronic device 102, 110 of FIG. 1, electronic device 110 in FIG. 2, electronic device 610, or any system or combination of the systems depicted in FIG. 1-2 or 6 described herein. The operations described in blocks 708-728 may also be stored as computer-executable instructions in a computer-readable medium.

Example method 700 may begin with block 708 that starts execution of the self-interference compensation method and recites "determine vectors for self-interference noise calculator." In the example, the center vectors may be determined according a cluster analysis. For example, an error may be minimized such that the distance from the cluster center to a given training point is minimized. Block 708 may be followed by block 712 that recites "generate connection weights for self-interference noise calculator." In the example, the connection weights may be determined according to a linear least-squares optimization or a batch processing embodiment as described herein. Block 712 may be followed by block 716 that recites "receive signal for transmission at self-interference noise calculator." Transmitter output data $x_1(n)$, $x_2(n)$, $x_3(n)$, $x_N(n)$ 510 may be received as input to a self-interference noise calculator. In the example, transmitter output may be a stream of transmission data from a corresponding transmitter that is performing RF operations on corresponding signals to be transmitted.

Block 716 may be followed by block 720 that recites "combine signals in accordance with vectors and connection weights to generate adjustment signals based on self-interference noise." For example, various ALUs, such as multiplication units, in an integrated circuit may be configured to operate as the circuitry of FIG. 5, thereby combining the transmitter output data $x_1(n)$, $x_2(n)$, $x_3(n)$, $x_N(n)$ 510 to generate adjusted signals $y_1(n)$, $y_2(n)$, $y_3(n)$, $y_L(n)$ 530 as described herein. Block 720 may be followed by a decision block 724 that recites "adjust signals received at respective antennas with adjustment signals based on self-interference noise." In the example, compensation components 245, 247 may receive the adjusted signals $y_1(n)$, $y_2(n)$ 241, 243 and compensate an incoming received wireless transmission from antennas 105, 107. In the example, the compensation components 245, 247 may subtract the adjusted signals $y_1(n)$, $y_2(n)$ 241, 243 from the received wireless transmission to produce compensated received signals for the respective wireless receivers 115, 117, thereby achieving full duplex compensation mode. Block 724 may be followed by block 728 that ends the example method 700.

In some examples, the blocks 708 and 712 may be an optional block. For example, determination of the center vectors and the connection weights may occur during a training mode of an electronic device described herein, while the remaining steps of method 700 may occur during an operation mode of the electronic devices described herein.

The blocks included in the described example method 700 is for illustration purposes. In some embodiments, these blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

From the foregoing it will be appreciated that, although specific embodiments of the present disclosure have been described herein for purposes of illustration, various modifications may be made without deviating from the spirit and scope of the present disclosure.

What is claimed is:

1. An apparatus comprising:
   a plurality of transmitting antennas;
   a plurality of receiving antennas;
   a plurality of wireless transmitters configured to transmit a respective plurality of transmit signals from a respective transmitting antenna of the plurality of transmitting antennas;
   a plurality of wireless receivers configured to receive a respective plurality of receive signals from a respective receiving antenna of the plurality of receiving antennas;
   a self-interference noise calculator coupled to the plurality of transmitting antennas and the plurality of receiving antennas, the self-interference noise calculator configured to generate a plurality of adjusted signals, the self-interference noise calculator comprising:
   a network of processing elements configured to combine a plurality of transmission signals into a plurality of sets of intermediate results, each transmission signal received from a respective wireless transmitter of the plurality of wireless transmitters,
   wherein the network of processing elements is further configured to sum each set of the plurality of sets of intermediate results to generate a corresponding adjusted signal of the plurality of adjusted signals; and
   wherein each wireless receiver of the plurality of wireless receivers is configured to receive the corresponding adjusted signal.

2. The apparatus of claim 1, wherein the self-interference noise calculator is configured to generate the plurality of adjusted signals based on a respective self-interference statistic of a plurality of self-interference statistics.

3. The apparatus of claim 2, further comprising:
   a plurality of compensation components, each compensation component coupled to an input of the plurality of wireless receivers and configured to generate a respective compensated received signal based on the plurality of adjusted signals.

4. The apparatus of claim 3, wherein the self-interference noise calculator is configured to transmit a respective adjustment signals to a respective compensation component.

5. The apparatus of claim 3, wherein each compensation component coupled to a respective output of a respective receiving antenna of the plurality of receiving antennas and configured to receive a respective radio frequency (RF) signal.

6. The apparatus of claim 5, wherein each compensation component configured to subtract a respective adjusted signal from the respective RF signal to generate the respective compensated received signal.

7. The apparatus of claim 6, wherein each compensation component coupled to a respective input of a respective wireless transmitter of the plurality of wireless transmitters, each wireless receiver of the plurality of wireless receivers is configured to receive the respective compensated received signal and to process the compensated received signal to generate a respective processed received signal.

8. The apparatus of claim 7, wherein each wireless receiver comprises:
a radio configured to down-convert the respective compensated received signal to a respective baseband signal;
an analog-to-digital converter configured to convert the respective baseband signal to a respective digital baseband signal; and
a fast Fourier transform component configured to convert the respective digital baseband signal to the respective processed received signal.

9. The apparatus of claim 1, wherein each respective transmission signal comprises a signal representative of interference to a respective receiving antenna of the plurality of receiving antennas.

10. The apparatus of claim 9, wherein each wireless transmitter of the plurality of wireless transmitters is configured to generate the respective transmission signal based on a respective signal to be transmitted, wherein each wireless transmitter comprises:
an inverse fast Fourier transform component configured to convert the respective signal to be transmitted to a respective frequency-domain signal;
an analog-to-digital converter configured to convert the respective frequency-domain signal to a respective analog baseband signal; and
a radio configured to up-convert the respective analog baseband signal to the respective transmission signal.

11. The apparatus of claim 9, wherein each intermediate processing result is weighted according to a respective weight for the corresponding adjusted signal to be generated by the set of intermediate results, the respective weight based on an amount of interference to the respective transmission signal from the corresponding intermediate processing result.

12. An apparatus comprising:
a plurality of antennas, each antenna configured to transmit a respective wireless communications signal;
a self-interference noise calculator coupled to each antenna of the plurality of antennas, the self-interference noise calculator comprising:
a plurality of bit manipulation units, each bit manipulation unit configured to receive the respective wireless communications signal;
a plurality of multiplication processing units, each multiplication processing unit configured to generate a plurality of noise processing results based on the respective wireless communications signal;
a plurality of accumulation processing units, each accumulation processing unit configured to generate a respective adjustment signal of a plurality of adjustment signals based on each noise processing result; and
a plurality of weighted connections, each weighted connection couples one of the multiplication processing units to one of the accumulation processing units.

13. The apparatus of claim 12, wherein each weighted connection comprises a respective weight for the weighted connection based on a minimized error for the plurality of adjustment signals.

14. The apparatus of claim 13, wherein the minimized error based on an optimization of the plurality of adjustment signals, the respective weights for the plurality of weighted connections, a corresponding vector of each multiplication processing unit, a sample vector for each processing element of the self-interference calculator.

15. The apparatus of claim 12, wherein each multiplication processing unit comprises a vector representative of self-interference of a respective wireless path to a first antenna of the plurality of antennas from at least one other antenna of the plurality of antennas.

* * * * *